(12) United States Patent
Storz

(10) Patent No.: US 6,426,490 B1
(45) Date of Patent: Jul. 30, 2002

(54) METHOD FOR OPERATING A PREFERABLY CONFOCAL LASER SCANNING MICROSCOPE

(75) Inventor: Rafael Storz, Bammental (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/582,204

(22) PCT Filed: Nov. 11, 1999

(86) PCT No.: PCT/DE99/03593

§ 371 (c)(1),
(2), (4) Date: Sep. 7, 2000

(87) PCT Pub. No.: WO00/29876

PCT Pub. Date: May 25, 2000

(30) Foreign Application Priority Data

Nov. 16, 1998 (DE) .......................................... 198 52 712

(51) Int. Cl.$^7$ ................................................. G02B 7/04
(52) U.S. Cl. .................................... 250/201.3; 250/205
(58) Field of Search .......................... 250/201.3, 201.5, 250/216, 306, 307, 205; 372/9, 6, 12, 13, 29

(56) References Cited

U.S. PATENT DOCUMENTS 5,120,953 A * 6/1992 Harris .................... 250/227.2

OTHER PUBLICATIONS

Osawa Hisao, "Laser Microscope," Patent Abstracts of Japan, #04170509, Jun. 18, 1992.
Tokita Muneo, "Apparatus for Irradiating Laser in Laser Scan Microscope," Patent Abstracts of Japan, #07139931, Jun. 2, 1995.

* cited by examiner

Primary Examiner—Que T. Le
(74) Attorney, Agent, or Firm—Foley & Lardner

(57) ABSTRACT

A method for operating a preferably confocal laser scanning microscope, the laser system (1) comprising at least one solid-state laser or a diode laser, is characterized in that, in order to avoid undesired distortions of the image information, the scanning procedure or the recording of data is synchronized with the phase of an at least largely continuous emission of intensity from the laser system (1). The laser system (1) and the data recording system (3) are synchronized by a control unit (2).

15 Claims, 1 Drawing Sheet

METHOD FOR OPERATING A PREFERABLY CONFOCAL LASER SCANNING MICROSCOPE

The invention relates to a method for operating a preferably confocal laser scanning microscope, the laser system comprising at least one solid-state laser or a diode laser.

In confocal laser scanning microscopy, gas lasers are most often used as illumination sources. The gas lasers take up a quite considerable amount of space, not least because of their gas tube. As a result, compact device designs of the gas lasers cannot be implemented. Furthermore, gas lasers have only a short service life, which results in quite considerable operating costs. In addition, gas lasers need intensive cooling during operation and require complicated air or water cooling, which in turn on the one hand entails costs and on the other hand increases the space requirement of such a laser system. Finally, lasers have a high energy consumption and, at the same time, only a low efficiency.

In addition to the conventional gas lasers, there are also already solid-state lasers. Until now, these have hardly been used in confocal laser scanning microscopy, since these always exhibit intensity fluctuations during the measurement process and these in turn distort the measurement result or superimpose interfering patterns on the actual image information. Stable-intensity solid-state lasers require complicated control mechanisms, which at least largely prevent the occurrence of spiking or relaxation fluctuations. In the embodiments known hitherto from practice, controlled solid-state lasers are complicated and expensive. Uncontrolled solid-state lasers have the drawback of a periodic mode concurrence, which always leads to a pulsed intensity behavior. Although adequate long-term stability can be achieved by means of periodic modulation of the pump light source, this then leads, because of the spiking and because of the relaxation oscillations, to a considerable short-term increase in the laser intensity which, in the case of use in confocal laser scanning microscopy, is associated with undesired interference effects in the process which yields the image. This is not acceptable in the case of the use in confocal laser scanning microscopy.

Spiking and relaxation oscillations are phenomena which are characteristic of most solid-state lasers and semiconductor lasers. In these phases, the recovery times for the population inversion of the excited state are substantially longer than the decay time of the laser resonator. These phenomena do not occur in gas lasers, so that when gas lasers are used, this problem has hitherto been paid hardly any attention.

Irrespective of the application in laser scanning microscopes, approaches to suppressing the spiking behavior of solid-state lasers have already been made. For this purpose, a nonlinear absorber has been inserted into the laser resonator to cause high losses at high intensities. Ultimately, this is a passive solution. Furthermore, an external control loop has already been provided, which operates with a detector and a loss modulator within the resonator. This is an active solution. Even small nonlinear loss elements damp the relaxation behavior considerably. As a result, this approach can be used only conditionally, since hitherto there were no good, rapidly acting optical limiters which have a low threshold value and, within a laser resonator, exhibit sufficiently low losses at the desired intensities. The external control, in accordance with which a loss modulator is provided outside the laser resonator, is therefore possible in principle but is in general complicated and expensive in operation. A stable mechanical design of the laser, acoustic insulation and stable current sources help to minimize the disadvantageous effects.

When frequency-doubling laser systems are used, active stabilization is technically extremely complicated, particularly when it is carried out for an external resonator. When quasi phase-adapted materials are used, a single passage through the nonlinear crystal is also possible, but this is inefficient and barely provides the necessary optical powers.

SUMMARY OF THE INVENTION

The present invention is therefore based on the object of specifying a method for operating a preferably confocal laser scanning microscope according to which the use of a solid-state laser or of a diode laser is possible and according to which undesired distortions of the image information are effectively avoided.

The above object is achieved by the features of patent claim 1. According to said claim, a generic method—using a solid-state laser or a diode laser—is characterized in that the scanning procedure or the recording of data is synchronized with the phase of an at least largely continuous emission of intensity from the laser system.

According to the invention, the synchronization of scanning procedure or data recording and a continuous emission of intensity from the laser system or the laser light source is provided. This achieves the situation where the data recording is synchronized with the time window of a quasi continuous emission of intensity from the solid-state laser or a diode laser, as a result of which no intensity fluctuations of the laser system occur during the measurement process. To this extent, distortion of the measurement result is ruled out.

According to the invention, it is now possible, instead of conventional gas lasers, to use solid-state or diode lasers in the confocal laser scanning microscope. Their suitability for confocal laser scanning microscopy depends on the stability of the intensity of the emitted laser radiation. While simple solid-state lasers without stabilization mechanisms typically exhibit interference in the image intensity when an image is recorded in conjunction with a confocal laser scanning microscope, said interference being attributable to spiking and relaxation fluctuations, these phenomena are avoided when data is being recorded from the confocal laser scanning microscope in the manner according to the invention, because the intensity fluctuations of the laser output, which are mostly regular, are compensated for by means of synchronization. This is ultimately achieved by unavoidable interference, as is generally unavoidable when conventional intensity control systems are used, specifically occurring at a defined point in time. With the knowledge of this situation the time window for the actual recording of the data begins—intentionally or in a controlled manner—only after the outlined interfering phase.

In concrete terms, the laser system, comprising a solid-state laser or a diode laser, and the data recording system are synchronized by a control unit, so that the data is recorded in the phase of the at least largely continuous emission of intensity from the laser system. With regard to the synchronization to be carried out, there are in principle two possibilities.

On the one hand, the natural oscillations of the laser system could be adjusted in such a way that the peak behavior of the laser can be used as a trigger pulse or as a synchronization pulse for the data recording system. By utilizing the preferably adjustable natural oscillations of the laser system, its peak behavior supplies a synchronization pulse for the data recording. The synchronization pulse could be fed indirectly or directly from the laser system to the data recording system. In concrete terms, the laser light source or the laser could have a synchronization output, which is connected via a line to the control unit. In this case, the laser could be adjusted such that a periodically repeating laser output intensity waveform occurs. The peak behavior or the spike of the laser is in this case used for synchronization, to be specific preferably via the control unit provided there, as a result of which the recording of the data from the laser scanning microscope is triggered.

On the other hand, the synchronization may be implemented by the laser system used being deliberately influenced by the control unit. To this extent, the laser system receives, via the control unit, a synchronization pulse whereupon, after a dead time, the at least largely continuous state of emission of the laser system is reached for a specific time period, during which the data is then recorded. The synchronization pulse is fed indirectly or directly from the data recording system to the laser system. In concrete terms, the laser system receives the synchronization pulse (trigger) at a time $t_0$, in order that, following a dead time $t_1$ which has to be waited for, the quasi continuous state of emission is reached for the time period $t_2$, which can then be used for the data recording. Ultimately, the control mechanism implemented here is used to stabilize the intensity of the laser system.

In addition, it is advantageous if the laser system sends a control message to the control unit, as a result of which the presence of the at least largely continuous emission of intensity from the laser system is indicated. When this indication occurs, fault-free data recording may be performed.

In principle, it is possible for the recording of each individual pixel in an image to be recorded to be synchronized or triggered. However, the synchronization effort required for this is considerable, because of the plethora of synchronization steps.

It is likewise conceivable for the recording of each individual line of an image to be recorded to be synchronized or triggered. In accordance with the number of pixels to be recorded in total, and the duration of the largely continuous intensity emission phase of the laser system which is suitable for image recording, it is also possible to synchronize or to trigger the recording within the range of a preferably selectable area of an image. If the phase of the quasi continuous emission of intensity from the laser system is adequate, this could also be used to record an entire image, so that the recording of the entire image is possible with a single synchronization. If more time is available, or if the image is composed of a lower number of image points, then the recording of a number of images can be initiated by a single synchronization pulse, so that the recording of a number of images—jointly—is synchronized or triggered. This ultimately depends on the number of image points to be recorded, and on the duration of the largely continuous intensity emission phase of the laser system.

In addition, it is conceivable for the laser system to have frequency-doubling characteristics. The laser system could also operate with an optical parametric oscillator (OPO) and could be used to generate at least two different wavelengths. This leads to quite considerable flexibility of the claimed method.

There are, then, various options of configuring and developing the teaching of the present invention in an advantageous way. For this purpose, reference should be made on the one hand to the claims following patent claim 1, on the other hand to the following explanation of an exemplary embodiment of the invention, using the drawing. In connection with the explanation of the preferred exemplary embodiment of the invention, using the drawing, preferred configurations and developments of the teaching are also explained in general terms. In the drawing:

DETAILED DESCRIPTION OF PREFERRED EMBODIMENTS

Figure 1:
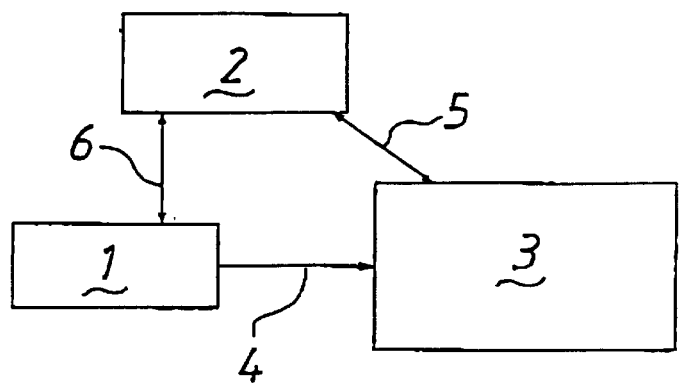
FIG. 1 shows, in a schematic illustration, the functioning of the method according to the invention in the context of a block diagram.

FIG. 1 shows, in the context of a schematic illustration, in the context of the block diagram, how the method according to the invention operates in principle. The laser system 1 comprises a quite specific laser light source, namely a solid-state laser. In the manner according to the invention, the scanning procedure or the recording of data is synchronized with the phase of an at least largely continuous emission of intensity from the laser system 1. For this purpose, a control unit 2 is provided, so that the data is recorded in the phase of the at least largely continuous emission of intensity from the laser system 1. In concrete terms, the data recording system 3 is a laser scanning microscope, which is connected via line 5 to the control unit 2. The laser system 1 is connected to the control unit 2 via line 6. The laser beam originating from the laser system 1 is identified by reference symbol 4. In total, a control loop is implemented.

In concrete terms, the laser system 1 or the laser light source provided there is connected to the control unit 2 via the line 6, to be referred to as the synchronization connection. The control unit 2 is in turn connected to the data recording system 3 or the laser scanning microscope via the line 5 there.

As an alternative to the exemplary embodiment shown in FIG. 1, it is also conceivable for the control unit 2 to be incorporated in the control unit (not shown in FIG. 1) of the data recording system 3, so that the control unit 2 can also quite well be an integral unit of the data recording system 3.

Figure 2:
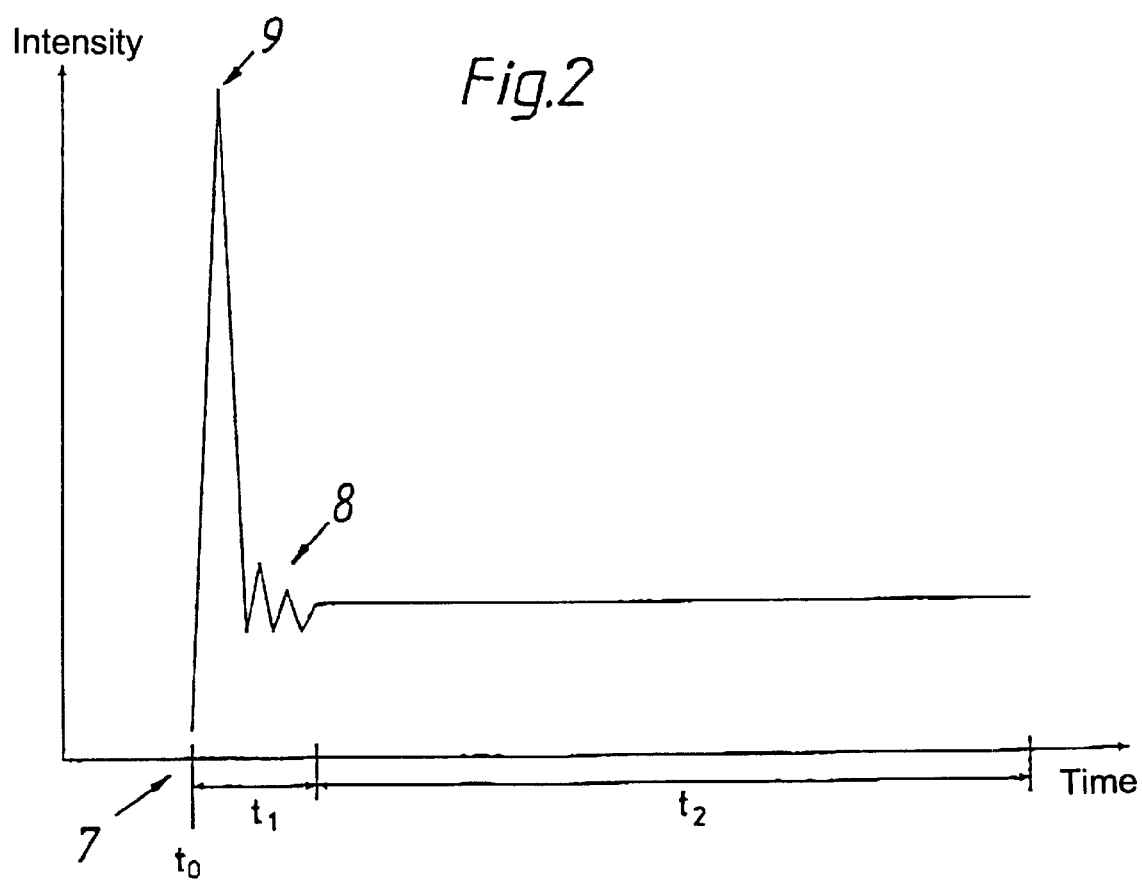
FIG. 2 shows, in a schematic illustration, the intensity waveform of the laser emission with the area of the at least largely continuous emission of intensity which can be used for recording the image.

Referring to FIG. 2, the functioning of the method according to the invention is to be described in the following text, to be specific within the context of two alternatives:

In the context of the first exemplary embodiment of the method according to the invention, a synchronization pulse 7 is output from the control unit 2 and, at the time $t_0$, is fed via line 6 to the laser system 1 or the laser light source there. The laser system 1 comprises a suitable control mechanism which starts the laser operation on the basis of the synchronization pulse 7. This is followed, in the laser resonator, by the otherwise undesired spiking and the relaxation oscillations 8, which in principle have a detrimental effect on the data recording of the system 3. Consequently, a wait is made for the time period to be referred to as the dead time $t_1$, it being possible for this dead time $t_1$ to be waited for to be reported back to the control unit by the laser system 1.

Following the dead time $t_1$, that is to say for example after 20 μs, the laser is in a state in which, for the time period $t_2$, it exhibits an at least largely continuous emission of intensity, that is to say a constant laser power output intensity. This time period $t_2$ is the actual useful period of the laser system 1, which can lie in the range from 50 µs to 100 µs. This time period is used for data recording or for the measurement procedure of the data recording system 3. After the time period $t_2$ has expired, the laser system 1 could again have a synchronization pulse 7 applied to it by the control unit 2 via the connection 6, in order specifically to repeat the procedure outlined above. Likewise, a signal could be made after which the data recording after the expiry of $t_2$ is not used.

In the context of a further exemplary embodiment, the laser system 1 or the laser light source provided there could have a synchronization output which is coupled to the line 6. In this case, the laser system 1 is adjusted in such a way that the laser output intensity waveform shown in FIG. 2 is repeated periodically, and that in this way the peak behavior or the spike of the laser system 1 is fed to the control unit 2 via line 6 for synchronization, and triggers the data recording of the data recording system 3 via line 5.

Finally, it should be noted that the exemplary embodiments explained above explain the teaching of the invention but do not restrict it to these exemplary embodiments.

LIST OF REFERENCE SYMBOLS

1 Laser system
2 Control unit
3 Data recording system/laser scanning microscope
4 Laser beam
5 Line
6 Line
7 Synchronization pulse
8 Relaxation oscillations
9 Spike

What is claimed is:

1. Method for operating a laser scanning microscope, wherein a laser system comprises at least one of a solid-state laser and a diode laser, and wherein one of a scanning procedure and data recording performance of a data recording system is synchronized with the phase of an at least largely continuous emission of intensity from the laser system.

2. Method according to claim 1, wherein the laser system and the data recording system are synchronized by a control unit, so that data is recorded by the data recording system in the phase of the at least largely continuous emission of intensity from the laser system.

3. Method according to claim 1, wherein by utilizing adjustable natural oscillations of the laser system, a peak behavior of the laser system supplies a synchronization pulse for the data recording system.

4. Method according to claim 3, wherein the synchronization pulse is fed indirectly or directly from the laser system to the data recording system.

5. Method according to claim 1, wherein the laser system receives, via a control unit, a synchronization pulse whereupon, after a dead time, the at least largely continuous emission of intensity from the laser system is sustained for a specific time period, during which data is recorded by the data recording system.

6. Method according to claim 5, wherein the synchronization pulse is fed indirectly or directly from the data recording system to the laser system.

7. Method according to claim 2, wherein the laser system sends a control message to the control unit, as a result of which the presence of the at least largely continuous emission of intensity from the laser system is indicated.

8. Method according to claim 1, wherein said one of the scanning procedure and the data recording performance is synchronized or triggered with said phase for each individual pixel in an image to be recorded.

9. Method according to claim 1, wherein said one of the scanning procedure and the data recording performance is synchronized or triggered with said phase for each individual line of an image to be recorded.

10. Method according to claim 1, wherein said one of the scanning procedure and the data recording performance is synchronized or triggered with said phase within the range of a preferably selectable area of an image to be recorded.

11. Method according to claim 1, wherein said one of the scanning procedure and the data recording performance is synchronized or triggered with said phase for an entire image.

12. Method according to claim 1, wherein said one of the scanning procedure and the data recording performance for a plurality of images is initiated by a synchronization pulse, so that said one of the scanning procedure and the data recording performance is jointly synchronized or triggered with said phase for said plurality of images.

13. Method according to claim 1, wherein the laser system has frequency-doubling characteristics.

14. Method according to claim 1, wherein the laser system operates with an optical parametric oscillator (OPO) and is used to generate at least two different wavelengths.

15. Method according to claim 1, wherein the laser scanning microscope comprises a confocal microscope.

* * * * *